United States Patent [19]
Hitchcock et al.

[11] Patent Number: 6,130,293
[45] Date of Patent: Oct. 10, 2000

[54] HIGH CLARITY POLYETHYLENE COMPOSITIONS

[75] Inventors: Amy Brossette Hitchcock; Andre De'Arrick Hodge, both of Longview, Tex.

[73] Assignee: Eastman Chemical Company, Kingsport, Tenn.

[21] Appl. No.: 09/132,203

[22] Filed: Aug. 11, 1998

[51] Int. Cl.[7] .............................. C08L 23/00; C08L 23/04
[52] U.S. Cl. ............................................ 525/191; 525/240
[58] Field of Search ...................................... 525/191, 240

[56] References Cited

U.S. PATENT DOCUMENTS

| | | |
|---|---|---|
| 5,663,236 | 9/1997 | Takahashi et al. . |
| 5,707,751 | 1/1998 | Garza et al. ............................ 428/515 |

FOREIGN PATENT DOCUMENTS

| | | |
|---|---|---|
| 0006110 | 1/1980 | European Pat. Off. . |
| 0048227 | 3/1982 | European Pat. Off. . |
| 0095253 | 11/1983 | European Pat. Off. . |

OTHER PUBLICATIONS

Cooke, Dave L. and Tikuisis, Tony, "Addition of Branched Molecules and High Molecular Weight Molecules to Improve Optical Properties of LLDPE Film", Journal of Plastic Film & Sheeting, Oct., 1989, pp. 290–307, vol. 5.

Cowell, Timothy J., "The Effects of Low Levels of Various LLDPE's on LLDPE Resin and Blown Film Properties", 1992 Polymers, Laminations & Coatings Conference, pp. 77–85.

*Primary Examiner*—Nathan M. Nutter
*Attorney, Agent, or Firm*—Jonathan D. Wood; Rose M. Allen; Harry J. Gwinnell

[57] ABSTRACT

A novel composition or blend is provided comprising a broad molecular weight distribution autoclave process low density polyethylene and a narrow molecular weight distribution gas phase process linear low density polyethylene, that is particularly suitable for use in the preparation of films having both clarity and strength.

24 Claims, No Drawings

HIGH CLARITY POLYETHYLENE COMPOSITIONS

FIELD OF THE INVENTION

This invention relates to linear low density polyethylene compositions or blends having high clarity, as indicated by the properties of high gloss and low haze. The polyethylene composition is a combination of a broad molecular weight distribution low density polyethylene (LDPE) and a narrow molecular weight distribution linear low density polyethylene (LLDPE).

BACKGROUND OF THE INVENTION

Linear low density polyethylenes (LLDPE) exhibit desirable properties in many applications, particularly in film products. More particularly, film grade linear low density polyethylenes are characterized by improved toughness in comparison to low density polyethylenes produced by either the well known autoclave or tubular processes. However, the clarity of the gas phase film grade linear low density polyethylenes (LLDPE) is poor. This is a disadvantage since, for many packaging applications, it is desirable that the film have properties of both clarity and toughness. Many attempts have been made heretofore to improve the optical properties of LLDPE, for example, by blending with LDPE.

SUMMARY OF THE INVENTION

It is an object of the present invention to provide new and improved polyethylene compositions or blends. These novel polyethylene compositions or blends are formed from specific linear low density polyethylenes (LLDPE) and specific low density polyethylenes (LDPE). The compositions and blends of the present invention result in new polyethylene compositions or blends having improved optical properties.

In accordance with the present invention, it has been found that the above and further objects are achieved by combining a broad molecular weight distribution autoclave process produced LDPE and a narrow molecular weight distribution gas phase process produced LLDPE. The resulting composition or blend is characterized by having improved optical properties, as exemplified by high gloss and low haze properties. This is particularly unexpected since whereas both the LLDPE and the LDPE polymers of the composition of this invention have relatively poor film clarity characteristics, the resultant composition or blend of the two polymers is characterized by having high clarity, when formed into films.

More particularly, in accordance with this invention, a polyethylene composition is provided comprising (a) from about 1 to about 3 weight percent of an autoclave process ethylene homopolymer having a density of about 0.915 to about 0.925 grams per cubic centimeter (g/cc), a molecular weight distribution (Mw/Mn) of about 9 to about 15, and a melt index of about I to about 4 grams per 10 minutes (g/10 min); and (b) from about 97 to about 99 weight percent of a gas phase process linear ethylene-alpha olefin copolymer, wherein the alpha olefin comonomer is present in amounts of about 5 to about 12% by weight of the copolymer and has about 3 to about 20 carbon atoms, the copolymer having a molecular weight distribution (Mw/Mn) of not greater than about 6, a density of about 0.90 to about 0.925 g/cc, and a melt index of about 0.3 to about 4.0 g/10 min. The present invention also relates to the use of the polyethylene compositions or blends in the production of films and articles of manufacture.

DETAILED DESCRIPTION OF THE INVENTION

The composition or blend of this invention is comprised of two components, a specific low density polyethylene (LDPE) and a specific linear low density polyethylene (LLDPE). The two components are described in further detail as follows.

The linear low density polyethylene (LLDPE) is a linear ethylene-alpha olefin copolymer containing an amount of from about 5 to about 12% by weight of alpha-olefin comonomer based upon the copolymer. The alpha-olefin comonomer contains from about 3 to about 20 carbon atoms per molecule. Examples of suitable comonomers are propylene, butene-1, pentene-1, 4 methyl-pentene-1, heptene-1, hexene-1, octene-1, 3-ethyl-1-hexene and mixtures thereof such as butene-1/hexene-1 and butene-1/octene-1 and the like. Preferred for use herein as the comonomer is hexene-1.

Further, the LLDPE component of the composition herein is characterized by having a melt index (M.I.) of from about 0.3 to about 4.0 g/10 minutes, preferably from about 0.25 to about 3.5 g/10 minutes. The LLDPE component is further characterized by having a density of from about 0.90 to about 0.925 g/cc, preferably from about 0.904 to about 0.922 g/cc. Additionally, the LLDPE component is characterized by having a molecular weight distribution (Mw/Mn) value of not greater than about 6.0, preferably from about 3.0 to about 5.0, and most preferably from about 3–5 to about 4.0.

The LLDPE component of the composition herein is produced by a gas phase fluidized bed process. As is well known in the industry, the gas phase fluidized bed process is a low pressure process wherein there are generally utilized as catalysts, transition metals in combination with metal halides or activated metal oxides. In more detail, the gas phase fluidized bed process for producing the LLDPE copolymers utilized herein entails the polymerization process taking place in a fluid bed reactor operating at about 300 psi at temperatures below 100° C. The reactor residence time is about 4 hours. The bed is kept fluidized by circulating the feed gas with a compressor. Exchangers in this cycle gas loop remove the heat of reaction. The polymer granules are continuously removed from the fluid bed in small batches by a cyclic removal system. The residual monomers are degassed and the granules are treated to deactivate the catalyst. The polymer granules and various additives are fed to a twin screw compounding extruder. The extruder puts sufficient work into the solids to melt and mix the solids. The melt is forced through an underwater die-face cutter to form conventional pellets. The pellets are then dried and packaged.

The low density polyethylene (LDPE) component of the composition herein is an ethylene homopolymer. More particularly, the LDPE component is characterized by having a melt index value of from about 1 to about 4 g/10 min., preferably from about 1.5 to about 2.5 g/10 min. The density of the LDPE herein ranges from about 0.915 to about 0.925 g/cc, preferably from about 0.915 to about 0.920 g/cc. The LDPE component herein has a molecular weight distribution value (Mw/Mn) of from about 9 to about 15, preferably from about 10 to about 14.

The low density polyethylene (LDPE) utilized herein is produced by the well known high pressure catalytic polymerization process in an autoclave reactor. In more detail, ethylene is polymerized under temperature and pressure in an autoclave reactor to form polyethylene. The reaction is a free-radical gas phase reaction utilizing a catalyst to initiate and maintain the reaction. The desired properties of the polyethylene, produced are determined by setting and maintaining specific operation conditions; feed gas rate, temperature and composition; reactor pressure and temperature; and the specific catalyst used. A LDPE synthesis plant consists of a reactor train. Several stages of compression increase the ethylene pressure up to about 1500 atmospheres before entering the reactor. The reactor feed gas is cooled before entering the reactor. The molten polymer is pumped from the extrusion hopper through a die face into a cutter cabinet where it solidifies and is cut into pellets. The pellets are then dried and packaged.

In accordance with the present invention, there is provided a polymeric composition or blend comprising (a) from about 97 to about 99 weight percent of the linear low density polyethylene (LLDPE) defined hereinabove, and (b) from about 1 to about 3 weight percent of the low density polyethylene (LDPE) defined hereinabove, wherein the weight percents are based on the weight of the polyethylene blend composition. A preferred composition or blend of this invention comprises an amount of about 98 weight percent LLDPE and an amount of about 2 weight percent LDPE, as defined hereinabove. Incorporation of an amount of LDPE in excess of about 3 weight percent is not as useful with the present invention since, as will be shown hereinafter, the overall properties of the composition are not as satisfactory when utilized as films.

For many purposes, it may be desirable to incorporate other conventional additives with the polyethylene compositions of the present invention. For example, there may be added antioxidants, heat and light stabilizers, dyes, antistatic agents, lubricants, preservatives, processing aids, slip agents, antiblocking agents, pigments, flame retardants, blowing agents, and the like.

The polyethylene composition or blend of the LLDPE and LDPE defined hereinabove is readily prepared by any method known in the art. For example, the components of the composition may be admixed together on a conventional mixing machine such as a mill roll, an extruder or a continuous mixer. In preparing the compositions or blends of the examples herein, the LLDPE and LDPE components were placed into a fiber drum and mixed for 5 minutes on an INS Plastic Tumbling unit.

The compositions or blends of the present invention may be fabricated into films by any technique known in the art, and are particularly suitable for use with blown-film techniques. As shown hereinafter in the examples, blown film is produced by introducing a polyethylene composition of the present invention, and other comparisons into the feed hopper of a 2.5 inch Egan extruder. The film was produced using a circular Sano die with a dual lip air ring. The six inch diameter die has an opening of 88 mils and an output rate of 4.9 pounds per hour per inch of die circumference.

The invention will be more readily understood by reference to the following examples. There are, of course, many other forms of this invention which will become obvious to one skilled in the art, once the invention has been fully disclosed, and it will accordingly be recognized that these examples are given for the purpose of illustration only, and are not to be construed as limiting the scope of this invention in any way.

EXAMPLES

The following test procedures were used in evaluating the analytical properties of the polyethylenes herein and in evaluating the physical properties of the films of the examples.

Melt Index—ASTM D1238 (at a temperature of 190° C.)

Density—ASTM D4888

Molecular Weight Distribution (Mw/Mn) is determined as the ratio of the weight average molecular weight to the number average molecular weight, with both values being determined from data collected from gel permeation chromatography. The gel permeation chromatograph used herein was carried out with a Waters 150 GPC chromatography, calibrated with a linear polyethylene standard, NBS-1475.

Haze—ASTM D1003

Dart—ASTM D1709A

Gloss—ASTM D2457

Tear—ASTM D1922

In each of the following examples wherein a composition or blend of an LLDPE and an LDPE are prepared, the following procedure was utilized. A predetermined amount of low density polyethylene (LDPE) pellets produced by the autoclave process described hereinbefore was weighed using a Toledo scale and placed into a fiber drum. To this was added a predetermined amount of linear low density polyethylene (LLDPE) pellets produced by the gas phase polymerization process described hereinbefore. The fiber drum containing both the LLDPE and LDPE pellets was then placed on an INS Plastic Tumbling unit and mixed for a period of five minutes yielding the desired polyethylene composition or blend.

Further, in each of the following examples wherein a film was produced from the polyethylene composition or blend, or from a control sample, the following procedure was utilized. The film was produced as a means to demonstrate the effects resulting from the present invention. In particular, the polyethylene component or composition was conveyed by air into the feed hopper of a 2.5 inch Egan extruder and blown film was produced using a circular Sano die with a dual lip air ring. The 6 inch diameter die has an opening of 88 mils and an output rate of 4.9 pounds per hour per inch of die circumference.

EXAMPLES 1–7

In these examples, LLDPE-1 was a high strength, gas phase process LLDPE control. LLDPE-1 had a melt index of 0.85 g/10 min., a density of 0.917 g/cc, and a molecular weight distribution (Mw/Mn) of 4. LDPE-1 was an ethylene-hexene-1 copolymer containing 8 weight percent 1-hexene. The LLDPE-2 component was a normal strength gas phase process ethylene-hexene-1 copolymer containing 8 weight percent 1-hexene. LLDPE-2 had a melt index of 0.9 g/10 min., a density of 0.920 g/cc, and a molecular weight distribution (Mw/Mn) of 3.9. The LDPE-1 component of Examples 3–7 was an ethylene homopolymer having a melt index of 1.7 g/10 min., a density of 0.918 g/cc, a molecular weight distribution (Mw/Mn) of 12.2 and was produced by the autoclave process described herein. The LLDPE-1 and LLDPE-2 components were produced by the gas phase polymerization process described hereinbefore. In Examples 1–7, the amounts of the LLDPE-1 and LDPE components are reported as weight percent, based on the total weight of the composition or blend, and the components were mixed as described above and formed into a film as described above. The results are shown in Table I.

TABLE I

| Example No. | | Ex. 1 100% LLDPE-1 | Ex. 2 100% LLDPE-2 | Ex. 3 99% LLDPE-1 1% LDPE-1 | Ex. 4 98% LLDPE-1 2% LDPE-1 | Ex. 5 97% LLDPE-1 3% LDPE-1 | Ex. 6 96% LLDPE-1 4% LDPE-1 | Ex. 7 95% LLDPE-1 5% LDPE-1 |
|---|---|---|---|---|---|---|---|---|
| Gloss | % | 65.2 | 64.0 | 75.7 | 77.5 | 75.5 | 76.7 | 76.5 |
| Haze | % | 7.6 | 7.0 | 6.2 | 5.4 | 5.2 | 5.0 | 5.3 |
| Dart | G | 290 | 200 | 320 | 266 | 216 | 189 | 192 |
| Tear-MD | G | 427 | 390 | 427 | 392 | 325 | 330 | 313 |
| Tear-TD | G | 581 | 625 | 664 | 625 | 661 | 658 | 628 |
| Thickness | Mil | 0.8 | 0.8 | 0.8 | 0.8 | 0.8 | 0.8 | 0.8 |

When reviewing the data of Table I, it is necessary to consider all of the properties. This is important since both the clarity and strength of the polymeric film product are useful for many packaging applications. As is apparent from the data, the polyethylene compositions of Examples 3, 4 and 5, containing respectively, amounts of 1, 2 and 3 weight percent of LDPE-1 offer the optimum balance of optical and strength properties when compared to films formed from 100% high strength LLDPE-1. The optical properties are significantly improved. Moreover, while there is a tendency toward reduced strength, it is noteworthy that the strength of the films of Examples 3, 4 and 5 is yet greater than the level of strength of the films of the normal strength LLDPE-2 of Example 2. With respect to Examples 6 and 7, however, it is noted that while there is improvement in optical properties of film produced therefrom, relative to both LLDPE-1 and LLDPE-2 produced films of Examples 1 and 2, there is an accompanying disadvantage in the level of strength. Indeed, the strength levels of the films produced from the polyethylene compositions of Examples 6 and 7 containing amounts of 4 and 5 weight percent LDPE-1, not only are significantly inferior to that of the high strength LLDPE-1 of Example 1, but also are below the strength level of the normal strength LLDPE-2 of Example 2. In addition, the strength level of the films produced from typical compositions of the present invention, as exemplified by Examples 3,4 and 5, containing 1,2 and 3 weight percent LDPE-1, significantly exceed that of films produced from polyethylene compositions containing 4 and 5 weight percent LDPE-1, as shown in Examples 6 and 7. Accordingly, the data in Table I support the criticality of the proportions of the LLDPE and the LDPE in the compositions or blends, and films, of the present invention.

EXAMPLES 8–14

In these Examples, there are shown the effects resulting from utilizing a broad molecular weight distribution LDPE and a narrow molecular weight distribution LDPE. As used herein a broad molecular weight distribution (Mw/Mn) is a ratio of about 9 to about 15, and a narrow molecular weight distribution (Mw/Mn) is a ratio of no greater than 6. The preparation of the polyethylene compositions or blends, and films produced therefrom, is carried out as described fully hereinabove. The control run of Example 8 utilizes an LLDPE-3 which is a copolymer of ethylene/hexene-1 containing 8 weight percent 1-hexene, and was produced by the gas phase polymerization process described hereinabove. Additionally, LLDPE-3 is characterized by having a melt index of 0.85 g/10 min., a density of 0.918 g/cc, and a molecular weight distribution (Mw/Mn) of 4. The LLDPE-3 was also used as the base component of the compositions or blends of Examples 9–14, wherein the LLDPE-3 was present in an amount of 98 weight percent based on the total polyethylene composition, and the LDPE component was present in an amount of 2 weight percent. For convenience, the characteristics of the LDPE component produced by the herein described autoclave process, utilized in each of Examples 9–14 are reported in Table II.

TABLE II

| Example No. & Reference | Ex. 9 LDPE-2 | Ex. 10 LDPE-3 | Ex. 11 LDPE-4 | Ex. 12 LDPE-5 | Ex. 13 LDPE-6 | Ex. 14 LDPE-7 |
|---|---|---|---|---|---|---|
| Melt index, g/10 min. | 20 | 20 | 7 | 7.4 | 1.7 | 1.7 |
| Density, g/cc | 0.916 | 0.919 | 0.917 | 0.921 | 0.918 | 0.920 |
| Molecular Weight Distribution, Mw/Mn | 11 | 4 | 11 | 3.6 | 12.2 | 3.5 |

The data showing the criticality of using a broad molecular weight distribution LDPE rather than a narrow molecular weight distribution LDPE as a component of a composition with a narrow molecular weight distribution (Mw/Mn) LLDPE is reported in Table III.

TABLE III

| Example No. | | Ex. 8 100% LLDPE-3 | Ex. 9 98% LLDPE-3 2% LDPE-2 | Ex. 10 99% LLDPE-3 2% LDPE-3 | Ex. 11 98% LLDPE-3 2% LDPE-4 | Ex. 12 98% LLDPE-3 2% LDPE-5 | Ex. 13 98% LLDPE-3 2% LDPE-6 | Ex. 14 98% LLDPE-3 2% LDPE-7 |
|---|---|---|---|---|---|---|---|---|
| Gloss | % | 64.2 | 81.9 | 74.9 | 75.6 | 79.7 | 81.7 | 79.0 |
| Haze | % | 7.6 | 5.1 | 6.4 | 4.6 | 6.7 | 4.3 | 5.2 |
| Dart | g | 450 | 567 | 220 | 305 | 119 | 330 | 375 |
| Tear-MD | g | 542 | 403 | 527 | 456 | 485 | 354 | 511 |
| Tear-TD | g | 617 | 673 | 609 | 625 | 602 | 672 | 685 |

With respect to the data in Tables II and III, evaluations are made by comparing, as pairs, Examples 9 and 10, Examples 11 and 12, and Examples 13 and 14. The comparisons are easily drawn since in each of the pairs of examples, the melt index and the density of the LDPE components are similar, whereas the molecular weight distributions (Mw/Mn) of the LDPE component of the polyethylene composition is either narrow (i.e. not greater than 6) or broad (i.e. from about 9 to about 15). It is important, when reviewing the data, to consider all the properties since a balance of the properties is of most importance to the production of films. As stated earlier, both clarity and strength of the film are important in many packaging applications. Accordingly, the data in Table III, on balance, show that superior properties were achieved by forming films from compositions or blends of a narrow molecular weight distribution LLDPE copolymer with an LDPE having a broad molecular weight distribution, as compared to a film from a composition containing a narrow molecular weight distribution LLDPE and a narrow molecular weight distribution LDPE. Therefore, it is clear from the data, in Tables II and III, that the molecular weight distribution of the LDPE component of the composition with the narrow molecular weight distribution LLDPE, must be broad, i.e. from about 9 to about 15, for the superior film properties to be obtained.

EXAMPLES 15–16

In these examples, the effects of using a LLDPE having a lower density are illustrated. More particularly, in Examples 15 and 16, there is utilized an LLDPE4 which is a copolymer of ethylene/hexene-1 containing 20 weight percent of 1-hexene, produced by the gas phase polymerization process described hereinabove. Further the LLDPE-4 is characterized by having a melt index of 0.5 g/10 min., a density of 0.906 g/cc, and a molecular weight distribution index (Mw/Mn) of 4. In Examples 15 and 16, there were produced compositions, and films therefrom, as described fully hereinabove. The composition of Example 16 comprised 98% by weight of LLDPE-4 and 2% by weight, based on the total weight of the composition, of LDPE-8. The LDPE-8 component was an ethylene homopolymer, produced by the autoclave process described hereinabove, characterized by having a melt index of 1.7 g/10 min., a density of 0.918 g/cc, and a molecular weight distribution (Mw/Mn) of 12.2. The results obtained are reported in Table IV.

TABLE IV

| Example No. | | Example 15 100% LLDPE-4 | Example 16 98% LLDPE-4 2% LDPE-8 |
|---|---|---|---|
| Gloss | % | 55.4 | 67.5 |
| Haze | % | 12.5 | 8.4 |
| Dart | g | Exceeds 2000 | 1522 |
| Tear-MD | g | 568 | 374 |
| Tear-TD | g | 560 | 597 |

From a review of the data in Table IV, it is apparent that the optical properties of an LLDPE film were significantly improved by providing a composition or blend of the LLDPE with a broad molecular weight distribution (Mw/Mn) LDPE. In this table of data, it is shown that the present invention is suitable for use with LLDPE having a lower density than that of the previously utilized LLDPE components.

It should be clearly understood that the forms of the invention herein described are illustrative only and are not intended to limit the scope of the invention. The present invention includes all modifications falling within the scope of the following claims.

What is claimed is:

1. A polymer blend composition comprising:
   (a) from about 1 to about 3 weight percent of an autoclave process produced ethylene homopolymer having a density of from about 0.915 to about 0.925 grams per cubic centimeter (g/cc), a molecular weight distribution (Mw/Mn) of from about 9 to about 15, and a melt index of from about 1 to about 4 grams per 10 minutes (g/10 min); and
   (b) from about 97 to about 99 weight percent of a gas phase polymerization process produced linear ethylene-alpha olefin copolymer, wherein the alpha-olefin comonomer is present in an amount of from about 5 to about 12 weight percent based upon the copolymer and has about 3 to about 20 carbon atoms, the copolymer having a molecular weight distribution (Mw/Mn) of not greater than 6, a density of from about 0.90 to about 0.925 grams per cubic centimeter (g/cc), and a melt index of from about 0.3 to about 4.0 grams per 10 minutes (g/10 min),
   wherein said weight percents are based on the total weight of said ethylene homopolymer (a) and said linear ethylene-alpha olefin copolymer (b).

2. The composition according to claim 1 wherein the alpha-olefin comonomer is selected from the group consisting of propylene, butene-1, pentene-1, 4 methyl-pentene-1, heptene-1, hexene-1, octene-1, 3-ethyl-1-hexene, and mixtures thereof.

3. The composition according to claim 2 wherein the alpha-olefin comonomer is hexene-1.

4. The composition according to claim 1 wherein the linear ethylene-alpha olefin copolymer has a melt index of from about 0.25 to about 3.5 grams per 10 minutes (g/10 min).

5. The composition according to claim 1 wherein the linear ethylene-alpha olefin copolymer has a density of from about 0.904 to about 0.922 grams per cubic centimeter (g/cc).

6. The composition according to claim 1 wherein the linear ethylene-alpha olefin copolymer has a molecular weight distribution (Mw/Mn) of from about 3.0 to about 5.0.

7. The composition according to claim 6 wherein the linear ethylene alpha-olefin copolymer has a molecular weight distribution (Mw/Mn) of from about 3.5 to about 4.0.

8. The composition according to claim 1 wherein the linear ethylene alpha-olefin copolymer has a melt index of from about 0.25 to about 3.5 g/10 min., a density of from about 0.904 to about 0.922 g/cc and a molecular weight distribution (Mw/Mn) of from about 3.0 to about 5.0.

9. The composition according to claim 8 wherein the linear ethylene alpha-olefin copolymer is ethylene-hexene-1.

10. The composition according to claim 1 wherein the ethylene hompolymer has a melt index of from about 1.5 to about 2.5 grams per 10 minutes (g/10 min).

11. The composition according to claim 1 wherein the ethylene homopolymer has a density of from about 0.915 to about 0.920 grams per cubic centimeter (g/cc).

12. The composition according to claim 1 wherein the ethylene homopolymer has a molecular weight distribution (Mw/Mn) of from about 10 to about 14.

13. The composition according to claim 1 wherein the ethylene homopolymer has a melt index of from about 1.5 to about 2.5 g/10 min., a density of from about 0.915 to about 0.920 g/cc, and a molecular weight distribution (Mw/Mn) of from about 10 to about 14.

14. The composition according to claim 1 wherein the linear ethylene alpha-olefin copolymer has a melt index of from about 0.25 to about 3.5 g/10 min, a density of from about 0.904 to about 0.922 g/cc and a molecular weight distribution (Mw/Mn) of from about 3.0 to about 5.0, and the ethylene homopolymer has a melt index of from about 1.5 to about 2.5 g/10 min., a density of from about 0.915 to about 0.920 g/cc, and a molecular weight distribution (Mw/Mn) of from about 10 to about 14.

15. The composition according to claim 14 wherein the linear ethylene alpha-olefin copolymer is ethylene-hexene-1.

16. The composition according to claim 1 wherein the ethylene homopolymer (a) is present in an amount of about 2 weight percent and the linear ethylene-alpha olefin copolymer (b) is present in an amount of about 98 weight percent.

17. The composition according to claim 14 wherein the ethylene homopolymer is present in an amount of about 2 weight percent and the linear ethylene alpha-olefin copolymer is present in an amount of about 98 weight percent.

18. The composition according to claim 17 wherein the linear ethylene alpha-olefin copolymer is ethylene-hexene-1.

19. A film formed from the composition according to claim 1.

20. A film formed from the composition according to claim 14.

21. A film formed from the composition according to claim 18.

22. An article of manufacture comprising the composition according to claim 1.

23. An article of manufacture comprising the composition according to claim 14.

24. An article of manufacture comprising the composition according to claim 18.

* * * * *